United States Patent [19]

Erlbeck

[11] 4,165,136
[45] Aug. 21, 1979

[54] CONTROL SYSTEM OF A RAILWAY VEHICLE AIR BRAKING SYSTEM

[75] Inventor: Hans Erlbeck, Unterzolling, Fed. Rep. of Germany

[73] Assignee: Knorr-Bremse GmbH, Munich, Fed. Rep. of Germany

[21] Appl. No.: 880,281

[22] Filed: Feb. 22, 1978

[30] Foreign Application Priority Data

Feb. 25, 1977 [DE] Fed. Rep. of Germany ....... 2708273

[51] Int. Cl.$^2$ .............................................. B60T 7/14
[52] U.S. Cl. .................................................... 303/19
[58] Field of Search ............................... 303/3, 15–17, 303/19, 20, 93, 94, 95, 101

[56] References Cited

U.S. PATENT DOCUMENTS

| | | | |
|---|---|---|---|
| 3,623,777 | 11/1971 | Sarbach et al. | 303/19 |
| 3,782,782 | 1/1974 | Brown | 303/19 |
| 3,901,558 | 8/1975 | Burkett | 303/16 |

FOREIGN PATENT DOCUMENTS

856052 12/1960 United Kingdom ...................... 303/19

*Primary Examiner*—Stephen G. Kunin
*Attorney, Agent, or Firm*—Edmund M. Jaskiewicz

[57] ABSTRACT

A condition-responsive or safety switch regulates the energizing of a first relay having two contacts that are open when non-energized. The first contact is connected to a contact switch of a differential pressure switch and regulates an energizing circuit for a second relay through a holding contact of the second relay. The second contact of the first relay is in series with a pressure switch and connected into an energizing circuit for the second relay in such a manner that a contact of the second relay when open in the deenergized state regulates a control circuit for a brake solenoid valve. The brake solenoid valve is in a connection between the control input and control output of an operator's brake valve. Pressure regulating apparatus is connected to the control output and apparatus for controlling pressure in the air line is connected to the control input. The solenoid valve when in the deenergized condition interrupts the connection between the control input and control output and establishes a throttled connection between the control input and the atmosphere. This causes a first air tank to be connected to the control input through a first throttle check valve opening in such direction of flow in such a manner that the pressure in the first air tank acts upon the differential pressure switch in its closing direction against the pressure in the operator's brake valve control input. A second air tank is connected to a second throttle check valve opening in such direction of flow to a control connection of the operator's brake valve which is vented to the atmosphere only in a position of the operator's brake valve that corresponds to full braking. Otherwise, compressed air is passed. The pressure in the second air tank acts upon the pressure switch in the opening direction thereof.

7 Claims, 1 Drawing Figure

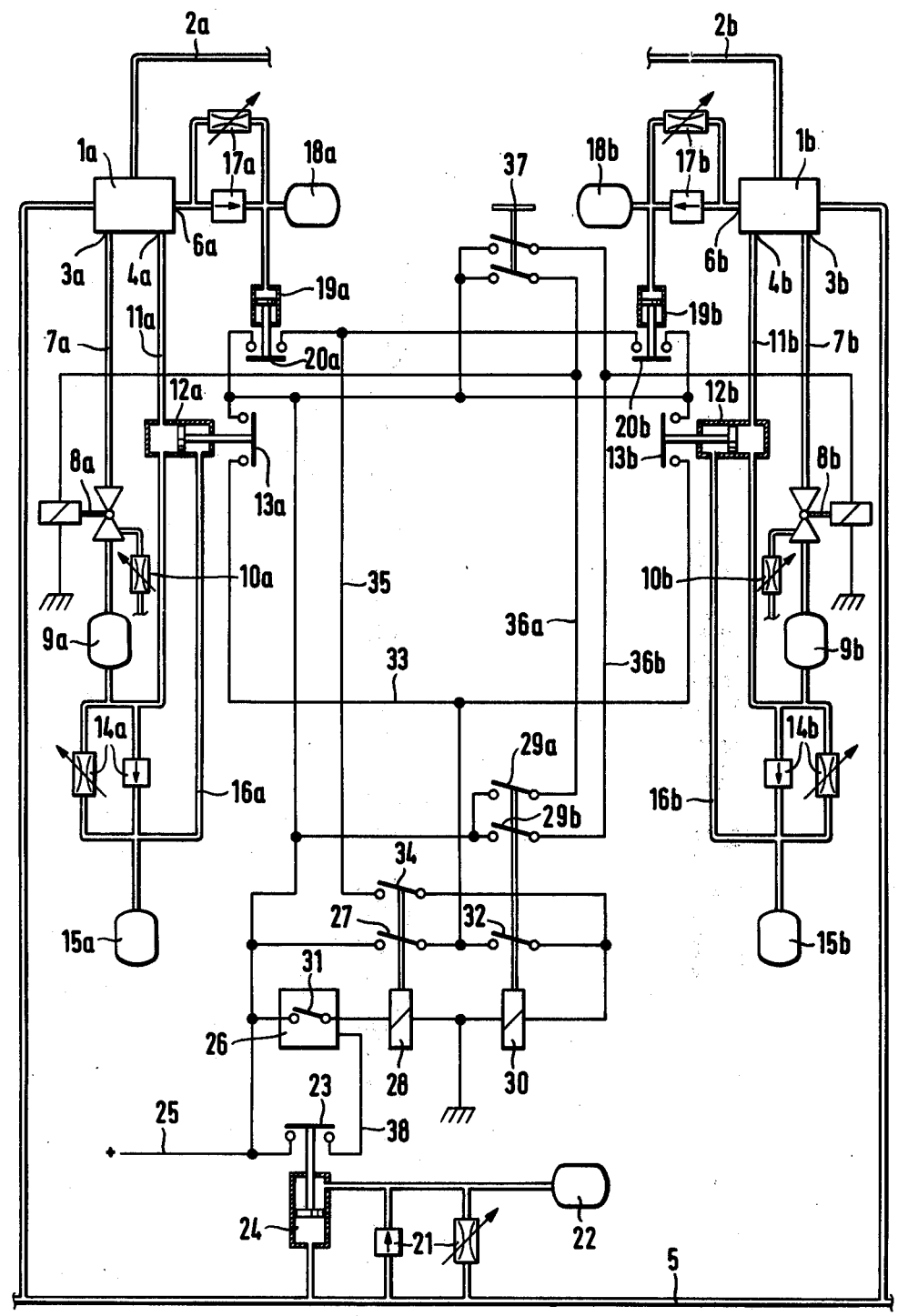

CONTROL SYSTEM OF A RAILWAY VEHICLE AIR BRAKING SYSTEM

The present invention relates to a control system for the compressed air brakes of railway vehicles, more particularly, to such a control system which generates a warning signal in response to a predetermined condition and in the event braking action is not started by the operator of the railway vehicle then a braking action is effected.

In order to control an air braking system for a railway vehicle there is generally provided at least one pressure regulator component which can be selectively varied by means of the operator's brake lever. The brake lever is mounted on the operator's brake valve which performs the general function of controlling the pressure in the air line and includes a relay valve controlled by the output pressure of the pressure regulator component. The control circuit has been provided with a safety switch which interrupts an electrical control circuit in the case of a predetermined condition, such as when a particular maximum speed has been exceeded. The interrupting of the control circuit then generates a warning signal for a predetermined period. Should no braking action be initiated by the operator during this warning signal period, the control system initiates a braking action which can be stopped only after the expiration of a predetermined time interval.

Such known control systems generally employ a large number of complicated components and thus are relatively expensive.

It is therefore the principal object of the present invention to provide such a control system which incorporates relatively simple structure and has a minimum of additional components so as to provide a reliable control system.

It is another object of the present invention to provide such a control system which can be readily incorporated in an existing conventional compressed air brake system of a railway vehicle.

According to one aspect of the present invention such a control system for an air brake system of a railway vehicle may comprise an operator's brake valve connected to an air line. The brake valve is provided with a control connection, a control output, a control input and has pressure regulating means connected to the control output and means for controlling pressure in the air line connected to the control input. In a connection between the control output and control input there is means for establishing a throttle connection to the atmosphere and a first air tank having a throttle check valve is connected to the control input. A differential pressure switch has one side responsive to the control input and its other side responsive to the pressure in the first air tank. A solenoid valve having an energizing circuit is also provided in the throttle connection establishing means. A second air tank is connected through a second throttle check valve to the control connection on the operator's brake valve and there is a pressure switch which is held in its opened position by the pressure in the second air tank. The pressure in the first air tank acts upon the differential switch in a direction to close the switch. A first relay has a first contact switch connected to the differential switch and a second contact switch in series with the pressure switch and both the first and second contact switches are open when the first relay is deenergized. A second relay has a third contact switch connected in series with the first contact switch and has an energizing circuit connected to the second contact switch. The second relay further has a fourth contact switch connected to the solenoid valve and the third and fourth contact switches are open when the second relay is deenergized. A normally closed condition-responsive switch is connected through an energizing circuit of the first relay so that opening of the condition-responsive switch in response to a predetermined condition, such as a particular speed, deenergizes the first relay to open the first and second contact switches and after a predetermined delay to deenergize the second relay. The fourth contact switch is then opened to actuate the solenoid valve which in turn opens the throttle connection to the atmosphere thereby decreasing pressure to the control input whereupon the brake valve is actuated to reduce pressure in the air line and a braking action is effected.

Other objects and advantages of the present invention will be apparent upon reference to the accompanying description when taken in conjunction with the follownng drawing, which is exemplary, which illustrates schematically the control system according to the pesent invention.

A railway vehicle such as a locomotive is provided in the conventional manner with two operator's cabs or stations, one at each end thereof. The present control system is described in connection with two such operator's platforms and, accordingly, the components for one operator's station are designated a and the components for the second operator's station are designated b.

Mounted on the operator's stations are two operator's brake valves 1a and 1b that are supplied with compressed air in a known manner from a source of compressed which is not shown. The brake valves 1a and 1b are actuated by means of the operating levers 2a and 2b. Each of the brake valves 1a and 1b have a conventional selectively operable pressure regulator, which is not shown in the drawing but has its output pressure supplied respectively to control outputs 3a and 3b. Each brake valve further has a relay valve which can be controlled by the pressure on the respective control inputs 4a and 4b so as to control the pressure in an air line 5 which is connected through 5a and 5b to the respective operator's valves.

The brake valves 1a, 1b also have respective control connections 6a and 6b vented only to the atmosphere in a position of the respective operating 2a and 2b corresponding to full braking. In all other positions of the operating levers the control connections 6a and 6b communicate with the source of compressed air which is not shown.

Connected to the respective control pressure outputs 3a and 3b are pipes 7a and 7b which are connected to solenoid valves 8a and 8b each of which are provided with means for venting and connecting on the other side to control tanks 9a and 9b. The solenoid valves 8a and 8b are closed when deenergized. The venting of the solenoid valves 8a and 8b is on the side of the respective control tanks 9a and 9b and this vent connection to the atmosphere is through respective adjustable throttles 10a and 10b.

The control air tanks 9a and 9b are connected through pipes 11a and 11b to differential switches 12a and 12b which are provided with contact switches 13a and 13b. The pipes 11a and 11b act upon the differential pressure switches 12a and 12b to open their respective contact switches and are subsequently connected to the control inputs 4a and 4b. The control tanks 9a and 9b are connected to first air tanks 15a and 15b through first throttle check valves 14a and 14b that are adjustable and open in such direction of flow. The pressure in first air tanks 15a 15b act through pipes 16a and 16b on the sides of differential pressure switches 12a and 12b in such a direction so as to close their contact switches 13a and 13b.

Second air tanks 18a and 18b are connected to the control connection 6a and 6b on the brake valves 1a and 1b through second throttle check valve 17a and 17b which are adjustable and open in such direction of flow. The pressures of air tanks 18a and 18b act upon pressure switches 19a and 19b in the direction to open their respective contact switches 20a and 20b.

A further air tank 22 is connected to the air line 5 through a further throttle check valve 21 which is also adjustable and opens in such direction of flow. The pressure in air tank 22 acts upon a pressure differential switch 24 in a direction so as to close its contact switch 23 against the pressure in the air line 5.

An electrical conductor 25 leads from a suitable voltage source on the railway vehicle, as known in the art, to the contact switch 23, to a safety or condition-responsive switch 26, to a first contact 27 of a first relay 28, to contacts 29a and 29b of a second relay 30, to differential switches 13a and 13b and to the pressure switches 20a and 20b. The safety or condition-responsive switch 26 responds to a predetermined condition, such as conditions of danger which may exist when a predetermined maximum speed has been exceeded. The maximum speed may relate to track conditions, travel conditions or to the operating conditions or characteristics of the particular railway vehicles. The danger condition may also occur when the operator does not operate the so-called dead-man-switch after a certain of period of time during which a warning signal is released by the safety switch 26. In the event that this warning signal period occurs without any braking action taking place, the safety switch 26 will open its switch 31 which is electrically connected to the energizing coil of the first relay 28 the other side of which is connected to ground. A second relay 30 is connected to the first relay 28 and has a holding contact 32 which is open in its deenergized condition and connected on one side to its coil grounded on the other side and also connected to a first contact 27 of first relay 28 as well as through an electrical conductor 33 to the pressure differential switches 13a and 13b. The first relay 28 is provided with a second contact 34 which is connected to the coil of the second relay 30 and through an electrical conductor 35 to the pressure switches 20a and 20b. First and second contacts 27 and 34 of the first relay 28 are open when this relay 28 is in its deenergized state. The second relay 30 has contacts 29a and 29b which are connected through conductors 36a and 36b to the coils of solenoid valves 8a and 8b, the other sides of these coils being grounded. The leads 36a and 36b are also connected through a double pole switch 37 sealed in is open position and connected to the electrical conductor 25. Electrical lead 38 is connected between switch 23 and safety switch 26.

When the compressed air braking system is pressurized and ready for operation, the operator's brake valve located at the station occupied by the operator, and designated subsequently as brake valve 1a, will supply a normal pressure level in the usual manner as known in the art into the main air line 5. The air tank 18a will be filled with air under pressure through the brake valve control connection 6a and the throttle check valve 17a and, when pressurized, will act upon the pressure switch 19a to hold its contact 20a in the open position. The normal pressure level controlled by the pressure regulator within the brake valve is applied to the output connection 3a. This pressure level is supplied through a pipe 7a and through the energized and thus open solenoid valve 8a to control tank 9a and through pipe 11a to the differential pressure switch 12a and back to the control input 4a. The air tank 15a is also subjected to the action of the normal level of pressure through the control check valve 14a and the pressure is also supplied through pipe 16a to the other side of the differential pressure switch 12a. Since the differential pressure switch 12a is subjected to the same pressure on both sides thereof, the contact switch 13a will be open.

The operator's brake valve 1b on the unoccupied operator's station is closed in its shut-off position. Because of the structure of the operator's brake valve, a predetermined pressure which is between atmospheric pressure and the normal pressure level will prevail in the pipes 7b and 11b and in air tanks 9b and 15b. The solenoid valve 8b is energized and opens the connection between pipe 7b and air tank 9b. The pressure on both sides of differential pressure switch 12b will be the same and thus its contact switch 13b will be open. Compressed air is applied through the control connection 6b on operator's brake valve 1b to fill the air tank 18b through throttle check valve 17b and thus the contact switch 20b will be held open as result of the pressure acting on its pressure switch 19b from tank 18b.

The air tank 22 is filled with air at the normal pressure level from air line 5 through throttle check valve 21 and contact switch 23 will be held open since its differential pressure switch 24 is subjected to the same pressure in both sides thereof.

The normal pressure level referred to in connection with the operation of this control system is the pressure level which is generally employed in the air braking system of the railway vehicle. This pressure level is known in the art and may vary slightly depending on the specific brake system. However, whatever pressure level is utilized to operate that particular braking system is the pressure level which is referred to herein. Thus, the present control system does not require any variation from the normal pressure level which would be ordinarily used in the railway vehicle air braking system.

When no danger condition exists, the contact switch 31 of the safety switch 26 is closed to maintain relay 28 energized thereby closing both contacts 27 and 34. Relay 30 is similarly energized through its closed holding contact 12 and maintains both solenoid valves 8a and 8b energized through the closed contact 19a and 19b. The conductors 33 and 35 are likewise connected to a current source and the switch 37 is open.

Should a predetermined danger condition occur, the safety switch 26 will generate a warning signal which may be audio, visual, or both, in a known manner for a predetermined period of time, such as, for example, 6 seconds. Should the danger condition still exist after the expiration of the period of time, the safety switch 26 will open its contact switch 31 to thus deenergize relay 28 whereupon contacts 27 and 34 will be opened.

If the operator of the railway vehicle did not react during the period when the warning signal was being emitted, the second relay 30 will become deenergized and will open its holding contact 32 as well as the contact switches 29a and 29b. Contact switches 13a and 13b will remain open. The opening of contact switches 29a and 29b will interrupt the energizing circuits of solenoid valves 8a and 8b so that the solenoid valves are closed to shut the passage from pipes 7a and 7b to respective air tanks 9a and 9b and thus vent these latter air tanks through respective throttles 10a and 10b to the atmosphere. The decrease of pressure in air tank 9a is transmitted through pipe 11a to control input 4a and induces the relay valve of the brake valve 1a to introduce a corresponding decrease of pressure into the air line 5 which decrease of pressure effects a braking action in the known manner. This decrease in pressure may result in a rapid braking action should the air line 5 be completely empty. The pressure in air tank 15a also decreases through its throttle check valve 14a and with a lag in time with respect to tank 9a. The resultant differential in pressure between air tanks 9a and 15a will act upon differential pressure switch 12a to close temporarily its contact switch 13a. However, because of the open holding contact switch 32 this closing of contact switch 13a will have no effect. After the air tanks 9a and 15a are completely emptied, contact switch 13a will again be opened.

A similar sequence of operations will occur at the other end of the vehicle in connection with the operator's brake valve 1b. While an overpressure will initially prevail in the pipes 7b and 11b, because the operator's brake valve 1b is shut, no effect will be produced on the pressure in the air line 5.

The decrease of pressure in air line 5 will also bring about a lagging or delayed decrease of pressure in air tank 22. A temporary differential in pressure thus acts upon differential pressure switch 24 to close temporarily switch 23 which emits an electrical signal to safety switch 26 indicating the introduction of the braking action. This emitted signal will occur during a corresponding period of time over the electrical lead 38.

When the danger condition no longer exists such as would occur when the speed of the vehicle decreases below the predetermined maximum speed, contact switch 31 in safety switch 26 will close and relay 28 will again be energized to close its contacts 27 and 34. However, because holding contact 32 still remains open, the second relay 30 and, accordingly, solenoid valves 8a and 8b will remain deenergized and contact switches 20a and 20b of pressure switches 19a and 19b are similarly open. The braking action thus continues.

In order to release the brakes after this braking action has been effected, the vehicle operator must shift the operating lever 2a of the brake valve 1a on the occupied operator's platform into a particular position in which the brake valve 1a continues to maintain air line 5a emptied but also connects control connection 6a to the atmosphere. Compressed air in air tank 11a is then vented through the atmosphere through throttle check valve 17a so that the pressure in air tank 18a is slowly decreased.

After elapse of a time interval which is sufficient for safely bringing the railway vehicle to a stop and which may amount to several minutes, the pressure in air tank 18a will be decreased to the point where pressure switch 19a will move in the closing direction to close its contact switch 20a. Through contact switch 20a, electrical lead 35 and closed contact 24, the second relay 30 will then be energized and will close its contact switches 32 and 29a and 29b as result of which solenoid valves 8a and 8b will again be energized. The operating lever 2a can now be shifted into a release position and the brake valve 1a will supply the normal pressure level into pipe 7a as well as into tank 9a through open solenoid valve 8a. The normal pressure level will be transmitted through pipe 11a to control input 4a and thus induce the relay valve of the brake valve 1a to supply a normal pressure level also into the air line 5 as result of which the brake is released. The brake release may also be effected through a filling impulse. Simultaneously with this release of the brake, control connection 6a is disconnected from the atmosphere and again connected to the source of compressed air to again fill air tank 18a to its normal pressure level whereupon pressure switch 19a is moved in the direction to open its contact switch 20a. However, the second relay 30 will remain energized through its closed holding contact 32 as well as through closed contact 27 of the first relay 28.

At the other end of the railway vehicle at which brake valve 1b is located, the pipe 11b remains without pressure or it is again pressurized to the initial pressure level. Air tank 22 is also again pressurized to the normal pressure level. At this stage the initial conditions prevail.

If the vehicle operator reacts when the warning signal is emitted and shifts operating lever 2a into the braking position before expiration of the warning signal period, the pressure regulator in brake valve 1a will introduce a corresponding decrease of pressure into output connection 3a. This pressure decrease is transmitted through pipe 7a, open solenoid valve 8a, air tank 9a and pipe 11a to control input 4a and induces the relay valve of brake valve 1a to introduce also a corresponding decrease of pressure into air line 5 which effects a braking action. The pressure in air tank 15a also decreases correspondingly but is delayed by the throttle check valve 14a. A pressure difference thus acts upon differential pressure switch 12a for a period of time corresponding to the decrease of pressure and this pressure difference will maintain switch 13a closed during this period of time. When the period for the warning signal has expired and the danger condition still exists, safety switch 26 will open its contact switch 31 as described above whereupon first relay 28 is deenergized with a consequent opening of its contacts 27 and 34. However, during the time that the switch 13a is closed, conductor 33 and holding contact 32 will maintain second relay 30 in the energized condition. Its contacts 29a and 29b will thus be closed to maintain solenoid valves 8a and 8b energized. As a result, no further automatic braking is introduced during the period of time that switch 13a is closed.

However, as soon as the pressure in air tanks 9a and 15a is equalized, differential pressure switch 12a will open its switch 13a to interrupt the current supply to conductor 33. If the danger condition still exists, an automatic forced braking will then occur as described above as result of the deenergization of relay 30. This automatic braking can be stopped only after a delayed period as determined by the time required to vent tank 18a. By increasing the braking effect through proper operation of brake valve 1a, the operator can effect a pressure difference between air tanks 9a and 15a for an additional period of time which pressure difference acting upon differential pressure switch 12a will hold contact switch 13a closed for an additional period of time so as to prevent any forced braking action during this period of time. An extension of the time during which the switch 13a is closed can be repeated up to complete emptying of air tanks 9a and 15a and thus up to attaining a full or rapid braking action. During this procedure the operating lever 2a can be moved into the rapid or full braking position either gradually or through a single movement. The switch 23 will be temporarily closed during the braking procedure as described above and will transmit a signal reporting the braking procedure through conductor 38 to the safety switch 26. However, contact switch 31 will remain open until the danger condition no longer exists.

If the danger condition is eliminated while contact switch 13a is closed as described above, contact switch 31 of safety switch 26 will also be closed, relay 28 deenergized and will close its contacts 27 and 34. Accordingly, the relay 30 and also solenoid valves 8a and 8b will remain energized also after switch 13a is opened and the brake valve 1a can again be moved into its released position.

In order to disconnect the control system as described above, the switch 37 can be closed by removing its seal. Preferably, the switch 37 is sealed in its open position, such as by a lead seal or the like, so as to be disregarded during normal operation of the railway vehicle. Closing of the switch 37 will provide a continuous energized state of solenoid valves 8a and 8b and these solenoid valves will remain energized as long as switch 37 is closed. The safety switch 26 can then no longer bring about a forced braking by opening of its switch contact 31.

It should be borne in mind that the entire control system as disclosed herein incorporates existing and normally available commercial components and can be readily incorporated in conventional braking systems which have already been installed in railway vehicles. A high degree of operating reliability is attained with this control system since the system operates in accordance with the closed circuit current principle.

It will be understood that this invention is susceptible to modification in order to adapt it to different usages and conditions, and accordingly, it is desired to comprehend such modifications within this invention as may fall within the scope of the appended claims.

What is claimed is:

1. A control system for an air brake system of a railway vehicle comprising an operator's brake valve connected to an air line and having an operating lever, said brake valve having a control connection, a control output, a control input and pressure regulating means connected to said control output and means for controlling pressure in said air line connected to said control input, connecting means between said control output and said control input including means for establishing a first throttle connection to the atmosphere, a first air tank having a first throttle check valve connected to said control input and a first differential pressure switch one side of which is connected to said control input and the other side connected to said first air tank, said throttle connection establishing means comprising a solenoid valve having an energizing circuit, a second air tank connected through a second throttle check valve to said control connection on said brake valve, a pressure switch connected to said second air tank and held in its open position by the pressure in said second air tank, the pressure in said first air tank acting upon said differential switch in the closing direction thereof, a first delay having a first contact switch connected to said first differential switch and a second contact switch in series with said pressure switch, said first and second contact switches being open when said first relay is deenergized, a second relay having a third contact switch connected in series with said first contact switch and having an energizing circuit connected to said second contact switch, said second relay having a fourth contact switch connected to said solenoid valve, said third and fourth contact switches being open when said second relay is deenergized, and a normally closed condition responsive switch connected to an energizing circuit of said first relay so that opening of said condition responsive switch in response to a predetermined condition deenergizes said first relay to open said first and second contact switches and after a predetermined delay deenergizes said second relay whereupon said fourth contact switch is opened to actuate said solenoid valve to open the throttle connection to the atmosphere thereby decreasing pressure to said control input to actuate said brake valve to reduce pressure in said air line to effect a braking action.

2. A control system as claimed in claim 1 and comprising a plurality of operator's brake valves and a corresponding plurality of each of said fourth contact switch, said first differential pressure switch, said pressure switch, said solenoid valve, said first and second air tanks and said first and second throttle check valves.

3. A control system as claimed in claim 1 and further comprising a selectively closeable switch connected into the energy circuit of said solenoid valve and in parallel with said fourth contact switch of said second relay.

4. A control system as claimed in claim 1 wherein at least one of said first and second throttle check valves is adjustable.

5. A control system as claimed in claim 1 wherein said first throttle connection establishing means further comprises an adjustable throttle.

6. A control system as claimed in claim 1 and further comprising a third air tank connected to said air line through a third throttle check valve, a second pressure differential switch having one side connected to said air line and having its other side connected to said third air tank, said third air tank having pressure therein acting in a direction to close said second differential pressure switch, and a fifth contact switch actuated by said second differential pressure switch and connected to a signal control circuit to said condition responsive switch.

7. A control system as claimed in claim 6 wherein said third throttle check valve is adjustable.

* * * * *